（12） United States Patent
Jernigan, IV

(10) Patent No.: US 9,558,115 B2
(45) Date of Patent: Jan. 31, 2017

(54) WRITE-BACK CACHING-BASED ATOMICITY IN A DISTRIBUTED STORAGE SYSTEM

(71) Applicant: NetApp, Inc., Sunnyvale, CA (US)

(72) Inventor: Richard Parvin Jernigan, IV, Sewickley, PA (US)

(73) Assignee: NETAPP, INC., Sunnyvale, CA (US)

( * ) Notice: Subject to any disclaimer, the term of this patent is extended or adjusted under 35 U.S.C. 154(b) by 207 days.

(21) Appl. No.: 14/258,307

(22) Filed: Apr. 22, 2014

(65) Prior Publication Data

US 2015/0301942 A1 Oct. 22, 2015

(51) Int. Cl.
*G06F 12/08* (2016.01)
*G06F 3/06* (2006.01)

(52) U.S. Cl.
CPC ....... *G06F 12/0804* (2013.01); *G06F 12/0813* (2013.01); *G06F 12/0815* (2013.01); *G06F 12/0868* (2013.01); *G06F 2003/0691* (2013.01); *G06F 2212/1044* (2013.01); *G06F 2212/152* (2013.01); *G06F 2212/154* (2013.01); *G06F 2212/254* (2013.01); *G06F 2212/261* (2013.01); *G06F 2212/263* (2013.01); *G06F 2212/463* (2013.01)

(58) Field of Classification Search
None
See application file for complete search history.

(56) References Cited

U.S. PATENT DOCUMENTS

| | | | |
|---|---|---|---|
| 6,430,657 B1 * | 8/2002 | Mittal | G06F 12/0837 711/118 |
| 2003/0131202 A1 * | 7/2003 | Khare | G06F 12/0831 711/146 |
| 2009/0113420 A1 * | 4/2009 | Pawlowski | H04L 67/10 718/1 |

FOREIGN PATENT DOCUMENTS

CA 2421700 A1 * 3/2002 ......... G06F 12/0813

* cited by examiner

*Primary Examiner* — Reginald Bragdon
*Assistant Examiner* — James J Thomas
(74) *Attorney, Agent, or Firm* — Nixon Peabody LLP; Khaled Shami

(57) ABSTRACT

A method includes receiving an atomic operation for execution, wherein the execution of the atomic operation is to access a data container stored in more than one data store device of a plurality of data store devices in a distributed storage system. The method includes executing, in response to receiving the atomic operation, a write-back cache operation for the data container to preclude access of the data container by a different operation prior to completion of the atomic operation. The method also includes executing the atomic operation, wherein executing the atomic operation comprises accessing the data container stored in the more than one data store device of the distributed storage system.

16 Claims, 8 Drawing Sheets

WRITE-BACK CACHING-BASED ATOMICITY IN A DISTRIBUTED STORAGE SYSTEM

BACKGROUND

Features generally relate to the field of data storage, and, more particularly, to atomicity using write-back caching in a distributed storage system.

The creation and storage of data has proliferated in recent years. Accordingly, there are a number of techniques and mechanisms that facilitate efficient and cost effective storage of large amounts of data. For example, a cluster network environment of nodes may be implemented as a data storage system to facilitate the creation, storage, retrieval, and/or processing of data. Such a data storage system may be implemented using a variety of storage environments, such as a network-attached storage (NAS) environment, a storage area network (SAN), a direct-attached storage environment, and combinations thereof. The foregoing data storage systems may comprise one or more data storage devices configured to store data within data volumes or containers.

Each data container can be serviced by a particular computer or node. Each data container can support a defined number of inodes, wherein each inode can represent one file or directory. These separate containers have limits regarding their size (derived from how many disks the computer can support), how much traffic can be served (derived from the processor, memory and network bandwidth available on the computer), how many discrete files can be stored (often limited by choice of storage format, such as using 32-bit quantities for inode numbers), etc. These container-derived limits are often very hard to raise. Raising these container limits can require significant investment in new hardware, for example, or an extensive software redesign that would require substantial investment.

SUMMARY

According to some features, a method includes receiving an atomic operation for execution, wherein the execution of the atomic operation is to access a data container stored in more than one data store device of a plurality of data store devices in a distributed storage system. The method includes executing, in response to receiving the atomic operation, a write-back cache operation for the data container to preclude access of the data container by a different operation prior to completion of the atomic operation. The method also includes executing the atomic operation, wherein executing the atomic operation comprises accessing the data container stored in the more than one data store device of the distributed storage system.

According to some features, an apparatus includes a processor and a computer readable storage medium having program instructions embodied therewith. The program instructions executable by the processor are to cause the apparatus to receive an atomic operation for execution, wherein the execution of the atomic operation is to access a data container stored in a plurality of data store devices of multiple nodes of a distributed storage system. The program instructions executable by the processor are to cause the apparatus to determine whether execution of the atomic operation would access the data container stored in more than one data store device of the plurality of data store devices. After determination that the atomic operation would access the data container stored in the more than one data store device, a write-back cache operation is to execute for the data container. The write-back cache operation comprises program instructions to request authority to access the data container stored in the more than one data store device and to store, after receipt the authority, copies of the data container in a cache. After execution of the write-back cache operation, the atomic operation is to execute, wherein the program instructions to execute the atomic operation comprises program instructions to access the data container stored in the more than one data store device of the distributed storage system.

BRIEF DESCRIPTION OF THE DRAWINGS

The present features may be better understood, and numerous objects, features, and advantages made apparent to those skilled in the art by referencing the accompanying drawings.

DETAILED DESCRIPTION OF EXAMPLE ILLUSTRATIONS

Figure 1:
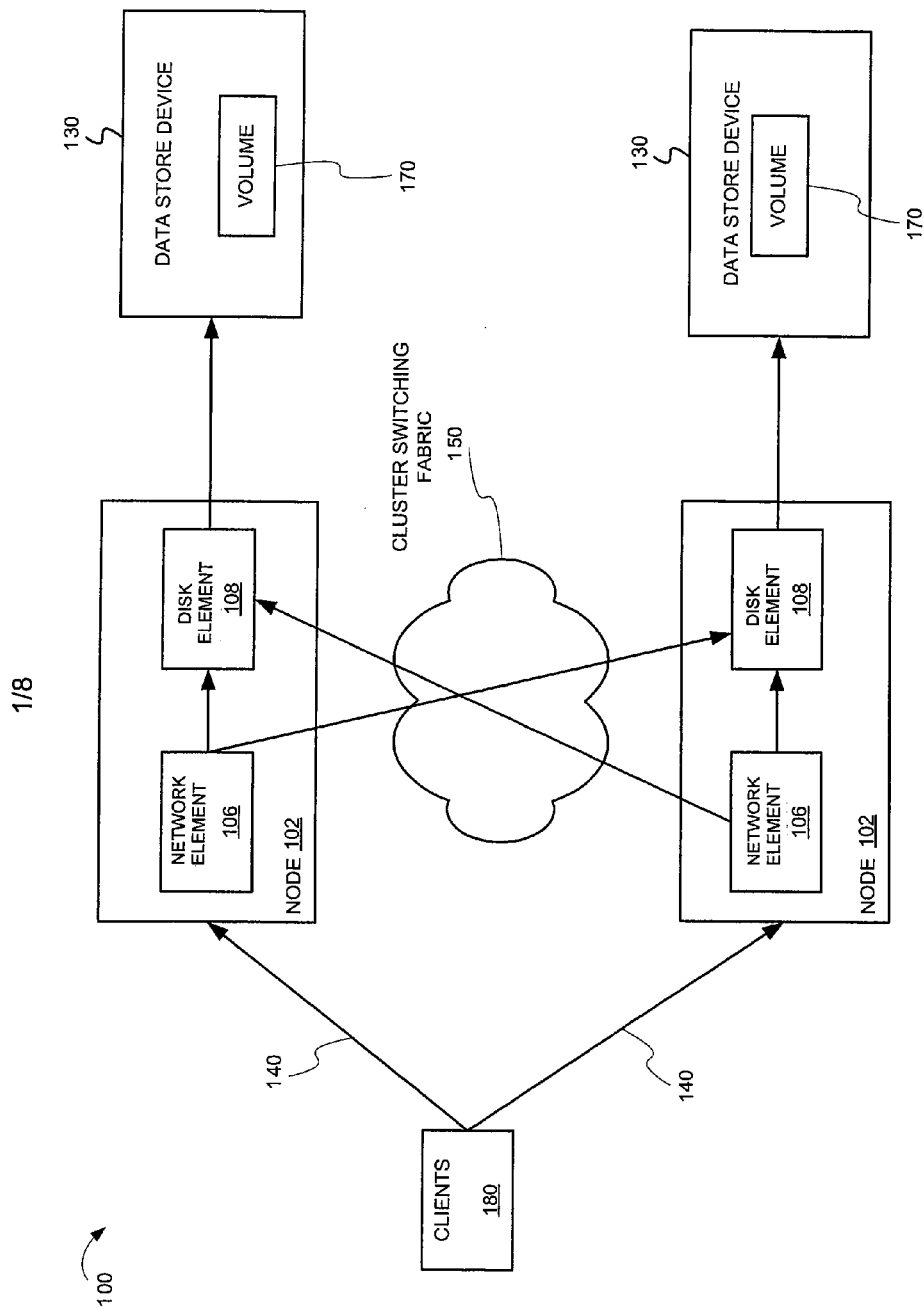
FIG. 1 depicts a distributed storage system having atomicity using write-back caching, according to some features.

The description that follows includes example systems, methods, techniques, instruction sequences and computer program products that embody techniques of the features described herein. However, it is understood that the described features may be practiced without these specific details. For instance, although examples refer to a file system, some features can be performed in other types of systems that store any other types of objects. In other instances, well-known instruction instances, protocols, structures and techniques have not been shown in detail in order not to obfuscate the description.

Some features enable atomicity for different file system transactions using write-back caching in a storage system (e.g., a file system) that is stored across multiple, discrete containers that span multiple computers or nodes (distributed storage system). Some features provide an aggregate performance and storage scalability that exceeds any individual container.

Atomic functionality is important in building a distributed, scalable storage system. An operation can be considered atomic if the operation will either entirely complete or entirely fail as a single transaction. In other words, the operation will not remain halfway complete because of an unexpected interruption. The NAS "rename" operation is an example of atomic operation. This rename operation includes removing one name from the file system and adding another. For this atomic operation, the system can be configured such that either both of the two actions (removing and adding) will happen (on success) or neither action occurs (on failure). The system is configured to prevent only one of the two actions to be executed.

A second aspect of atomicity is important because no storage system change can be accomplished instantaneously. If more than one part of a storage system is to be changed to accomplish an atomic operation, it is imperative that clients not be allowed to view the aspects of the storage system that are in a partially modified state. That is, even if a rename operation will eventually complete entirely, the storage system also needs to ensure that, between the time that the old filename is removed and the new filename is added, clients are not able to observe those parts of storage system (since the clients might incorrectly observe a storage system that appears to have both filenames missing, or both filenames incorrectly visible, concurrently). In other words, the storage system is to perform atomically and is to be seen to perform atomically.

In a conventional distributed storage system, atomicity is typically provided by using a transaction log. When a first computer in the distributed storage system is to perform an atomic operation affecting its own resources and resources stored or controlled by a second computer, the first computer records its intentions to perform the atomic transaction in a transaction log. Subsequently, the first computer will continue to execute the different actions for an atomic transaction until the atomic transaction is successful. In particular, the first computer driving the atomic transaction monitors the transaction log after a failure of the atomic transaction. The first computer will then re-execute the actions of the atomic transaction until the atomic transaction is successful (based on monitoring the transaction log). This model of execution of an atomic transaction requires a storage system manipulation and locking protocol in which a first computer notifies a second computer of the changes to be made. Therefore, the more extensive the support for various NAS protocols, the more extensive this intra-computer protocol must be. For example, some conventional storage systems can require special-purpose messages used between nodes to direct caching of Common Internet File System (CIFS) watch data, create directory entries, perform cross-stripe writes, adjust file timestamps, etc. Some conventional storage systems can require more than forty special-purpose messages overall, which can result in a significant amount of product development investment.

Therefore, atomicity can be easier to achieve when a single computer or node owns all the resources being manipulated by an operation. For example, if a single computer can control changes to both directories involved in a rename operation, then the single computer can take the steps necessary to ensure that either all or none of those changes are committed to the storage system. Atomicity is much harder to accomplish when a storage system is distributed across multiple NAS containers that span multiple nodes, because the resources that are to be managed during a single transaction are usually not available in one place. Therefore, computers normally require a complex protocol to negotiate changes to those remote resources.

In contrast to conventional approaches, some features employ write-back caching to gain authority over the resources necessary to perform a distributed operation atomically. Even if the resources required for an operation are scattered across a number of separate NAS containers, the write-back caching protocol can be used to obtain authority over those resources with a single computer. The single computer can accomplish its changes to the file system atomically with relative ease, because the requisite resources are under its direct control using write-back caching.

To help illustrate write-back caching, write-through caching is first described. Typical write-through caching is read-only—a client that accesses cache can read the cached version of the storage system. If the cache does not have the necessary data, the data will be retrieved from the origin container on a data storage device. However, if a client is to change data, the storage system bypasses the cache and instead modifies data in the origin container. Changes to the origin container are temporarily blocked while the origin node forces caches to discard any corresponding old cached data, before the origin allows its canonical storage system to change.

In contrast to write-through caching, write-back caching allows for both reading and writing of the cached data. In other words, in a write-back cache, the cache containers can also accept client requests that would change the storage system. Prior to modification of the cached data, a requesting node having a cache obtains authority for the modification from the origin node. The origin node can grant authority when the data is not being accessed by itself or other caches in the storage system. After obtaining authority, the requesting node can retain the authority to make one or more changes to the cached data stored in its cache. In other words, multiple service requests can be processed for modifying the cached data. Subsequently, the origin node can recall that authority. For example, the origin node can recall authority to enable itself to access the data or grant authority to a different cache on a different node. In response to recalling authority, any changes made to the cached data can be written back to the origin node. The origin node can write these changes to its own copy of the data in its local store before itself or other caches are granted authority over the data.

Therefore, write-back caching can replace several of the normal requisite pieces for distributed storage of atomic operations. For example, according to some features, no transaction log is necessary for processing atomic operations. If a particular node obtains half the resources required for an operation and then fails, there is no need to force the operation to be replayed. No changes have been made yet, and the original owners of the delegated resources (the origin nodes) can eventually reclaim their resources when needed.

Further, using write-back caching for atomic operations can simplify the communications protocol required between the member nodes. Using some features, the caching protocol includes messages to obtain and revoke authority over an object, to read data and meta-data from the origin node and report back data and meta-data that have changed in the cache. This caching protocol can suffice for communications to enable atomicity for the entirety of the distributed storage system. In comparison, conventional distributed storage systems require specialized messages for every node-spanning operation: distinct messages to change directories, allocate objects, change directories, etc. Thus, the more NAS protocols supported by the storage system, the more complex that inter-node communications protocol must become.

Additionally, using write-back caching for atomicity can eliminate the need for a separate locking mechanism to hide in-flight storage system changes. Write-back caching itself implicitly causes client access to in-flux objects to stall (while the node revokes its change-authority from the caching node). Therefore any separate locking mechanism—such as would normally be required for atomic operations in a distributed storage system—would be redundant.

FIG. 1 depicts a distributed storage system having atomicity using write-back caching, according to some features. FIG. 1 depicts a system 100 that includes a number of nodes 102 (including node 102A and node 102B) interconnected as a cluster and configured to provide storage service for data containers or objects (e.g., files) across one or more data volumes. The nodes 102 include various functional components that cooperate to provide a distributed storage system architecture of the cluster.

Each node 102 can include a network element 106 and a disk element 108. The network element 106 includes functionality that enables the node 102 to connect to clients 180 over a network 140. The disk element 108 includes functionality to connect to one or more storage devices, data store devices 130. The nodes 102 are interconnected by a cluster switching fabric 150 which may be embodied as a Gigabit Ethernet switch. It should be noted that while there is shown an equal number of network and disk elements in the illustrative cluster, there may be differing numbers of network and/or disk elements in accordance with some features. For example, there may be a number of network and/or disk elements interconnected in a cluster configuration that does not reflect a one-to-one correspondence between the network and disk elements.

The clients 180 may be general-purpose computers configured to interact with the nodes 102 in accordance with a client/server model of information delivery. That is, each of the clients 180 may request the services of the nodes 102. The nodes 102 may return the results of the services requested by the clients 180, by exchanging packets over the network 140. The clients 180 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the clients 180 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

According to some features, data store devices 130 include volumes 170, which are components of storage of information in disk drives, disk arrays, and/or other data stores (e.g., flash memory) as a file-system for data, for example. According to some features, volumes can span a portion of a data store, a collection of data stores, or portions of data stores, for example, and typically define an overall logical arrangement of file storage on data store space in the distributed file system. According to some features, a volume can comprise stored data containers (e.g., files) that reside in a hierarchical directory structure within the volume.

Volumes are typically configured in formats that may be associated with particular file systems, and respective volume formats typically comprise features that provide functionality to the volumes, such as providing an ability for volumes to form clusters. For example, where a first file system may utilize a first format for their volumes, a second file system may utilize a second format for their volumes.

Figure 2:
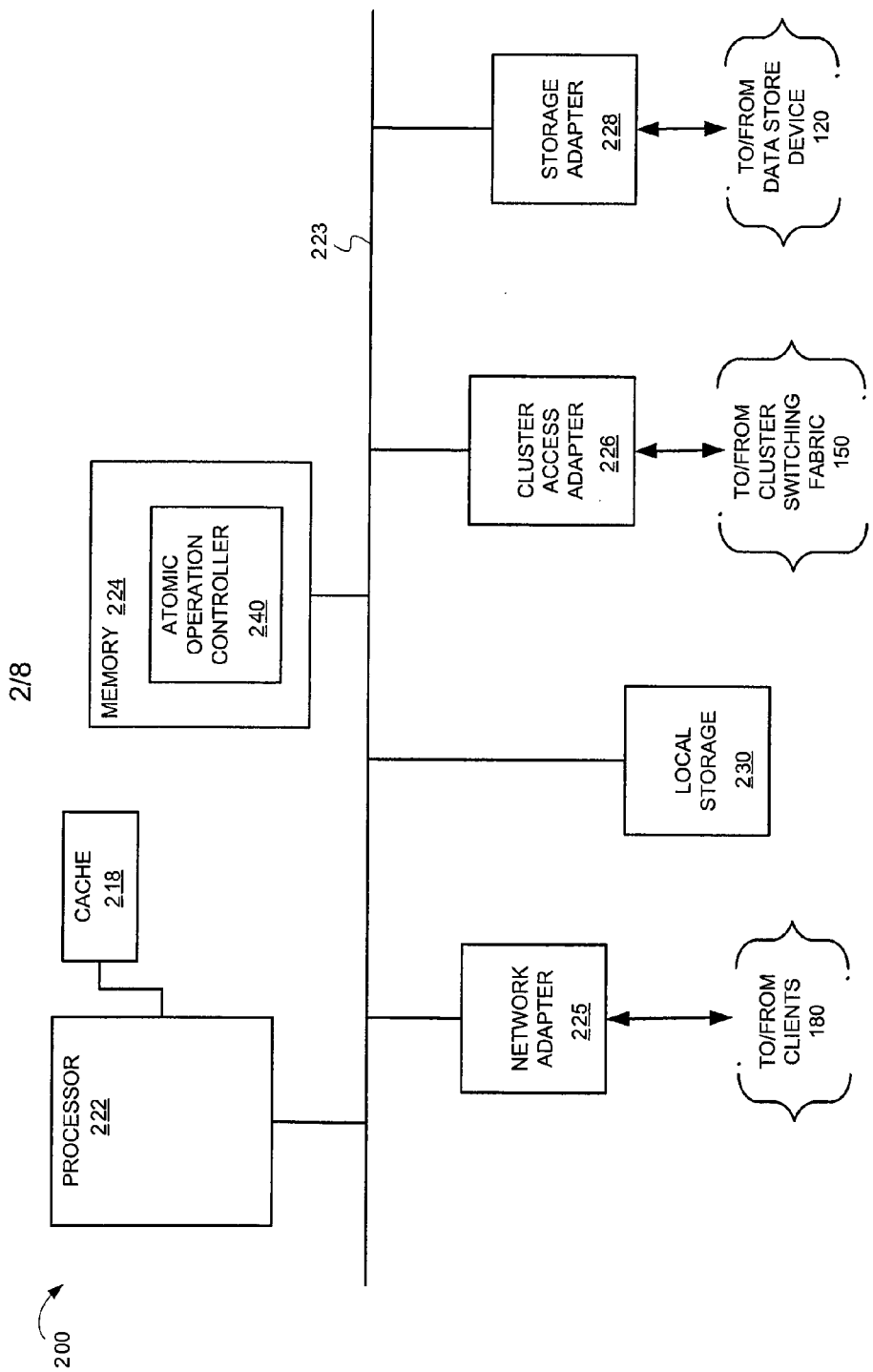
FIG. 2 depicts a block diagram of a node in a distributed storage system, according to some features.

FIG. 2 depicts a block diagram of a node in a distributed storage system, according to some features. In particular, FIG. 2 depicts a node 200 which can be representative of the nodes 102 of FIG. 1. The node 200 includes a processor 222, a memory 224, a network adapter 225, a cluster access adapter 226, a storage adapter 228, and a local storage 230 interconnected by a system bus 223. Also, the processor 222 is coupled to a cache 218.

The local storage 230 includes one or more storage devices, such as disks, for storage of local data by the node 200. The cluster access adapter 226 includes a number of ports adapted to couple the node 200 to other nodes of the system 100. In some examples, Ethernet can be used as the clustering protocol and interconnect media. In some examples, where the N-modules and D-modules are implemented on separate storage systems or computers, the cluster access adapter 226 is used by the N/D-module for communicating with other N/D-modules in the system 100.

Each node 200 can be embodied as a single or dual processor storage system executing a storage operating system that implements a high-level module, such as a file system, to logically organize the information as a hierarchical structure of named directories, files and special types of files called virtual disks (or generally "objects" or "data containers") on the disks. However, it will be apparent to those of ordinary skill in the art that the node 200 may alternatively comprise more than two processors. One processor 222 can execute the functions of the N-module on the node, while another processor 222 can execute the functions of the D-module.

The memory 224 includes storage locations that are addressable by the processors and adapters for storing software program code and data structures, in accordance with some features. The processor and adapters may, in turn, comprise processing elements and/or logic circuitry configured to execute the software code and manipulate the data structures. An atomic operation controller 240, portions of which are typically resident in memory and executed by the processor 222, can perform operations for controlling execution of atomic operations across multiple nodes (as further described below).

The network adapter 225 includes a number of ports adapted to couple the node 200 to one or more clients 180 over point-to-point links, wide area networks, virtual private networks implemented over a public network (Internet) or a shared local area network. The network adapter 225 thus may include the mechanical, electrical and signaling circuitry needed to connect the node 200 to the network. Illustratively, the network may be embodied as an Ethernet network or a Fibre Channel (FC) network. Each client 180 may communicate with the node 200 by exchanging discrete frames or packets of data according to pre-defined protocols, such as TCP/IP.

The storage adapter 228 can cooperate with a storage operating system executing on the node 200 to access information requested by the clients. The information may be stored on any type of attached array of writable storage device media such as video tape, optical, DVD, magnetic tape, disks, bubble memory, electronic random access memory, micro-electro mechanical and any other similar media adapted to store information, including data and parity information. The storage adapter 228 can include a number of ports having input/output (I/O) interface circuitry that couples to the disks over an I/O interconnect arrangement, such as a conventional high-performance, FC link topology.

Storage of information on each data store device 130 can be implemented as one or more storage "volumes" that include a collection of physical storage disks cooperating to define an overall logical arrangement of volume block number (VBN) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID configurations, such as a RAID-4 level configuration, enhance the reliability/integrity of data storage through the redundant writing of data "stripes" across a given number of physical disks in the RAID group, and the appropriate storing of parity information with respect to the striped data. An illustrative example of a RAID configuration is a RAID-4 level configuration, although it should be understood that other types and levels of RAID configurations may be used in accordance with some features.

Figure 3:
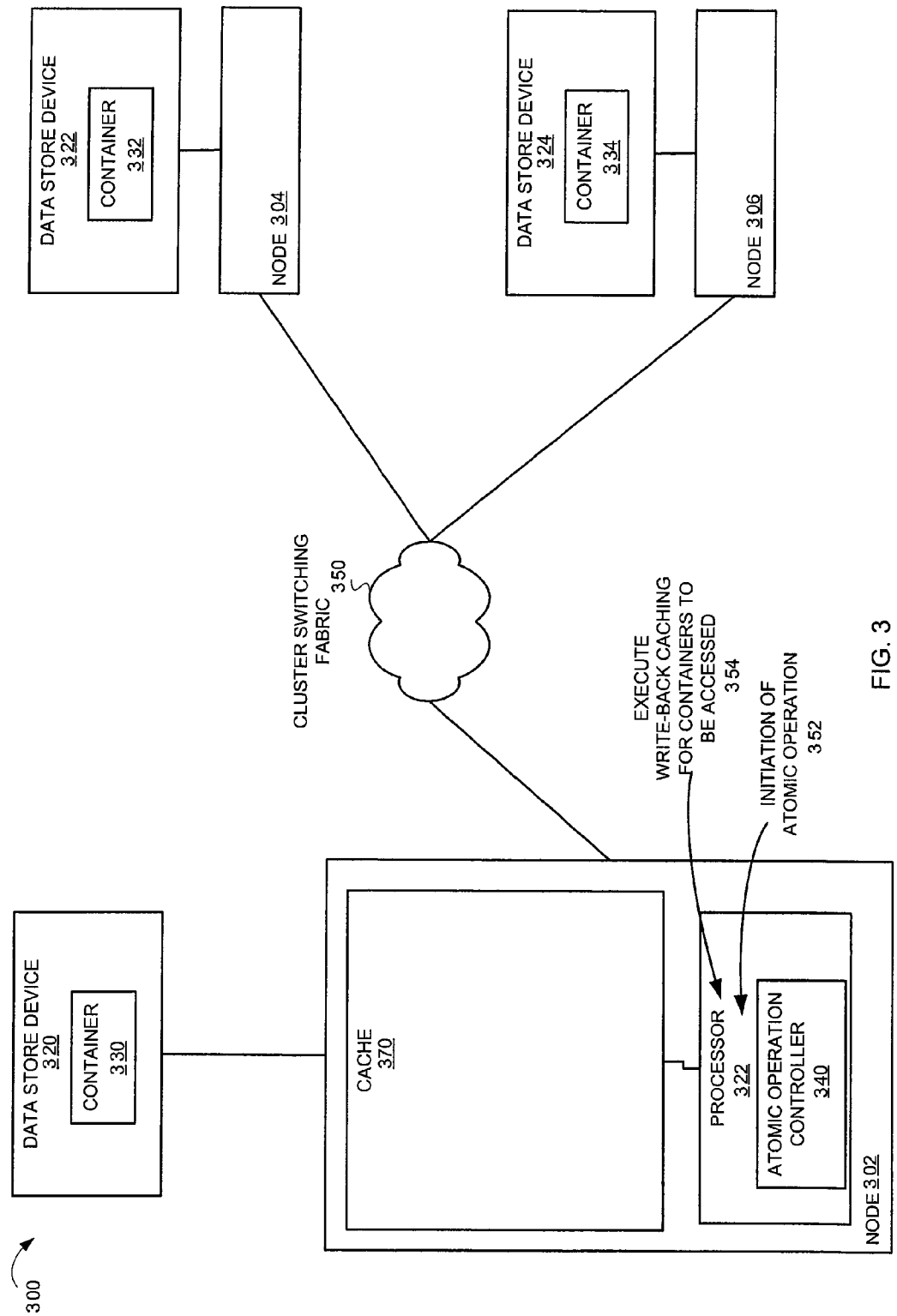
FIGS. 3-6 depict operations and messaging in a distributed storage system for execution of an atomic operation using write-back caching, according to some features.
Figure 4:
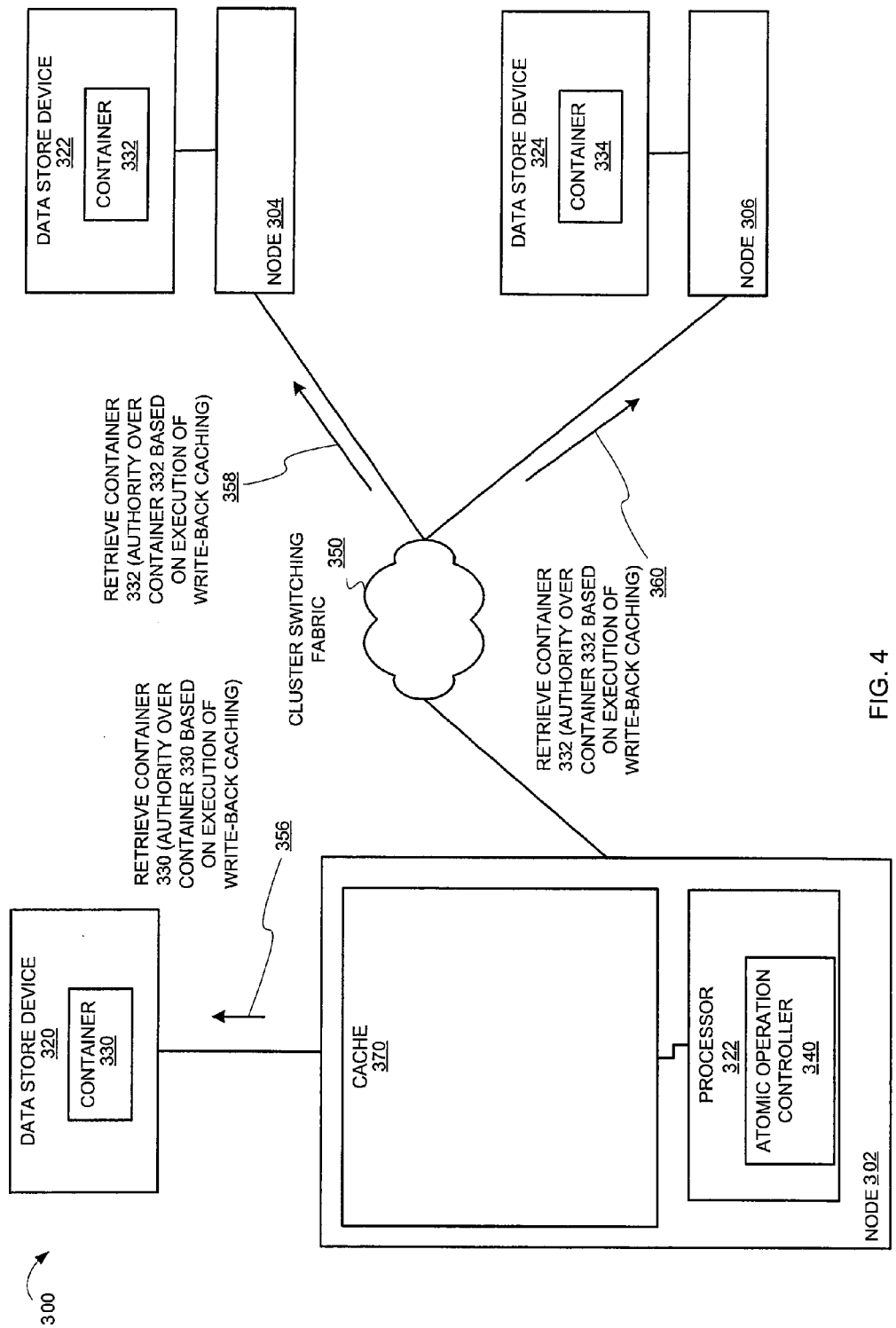
Figure 5:
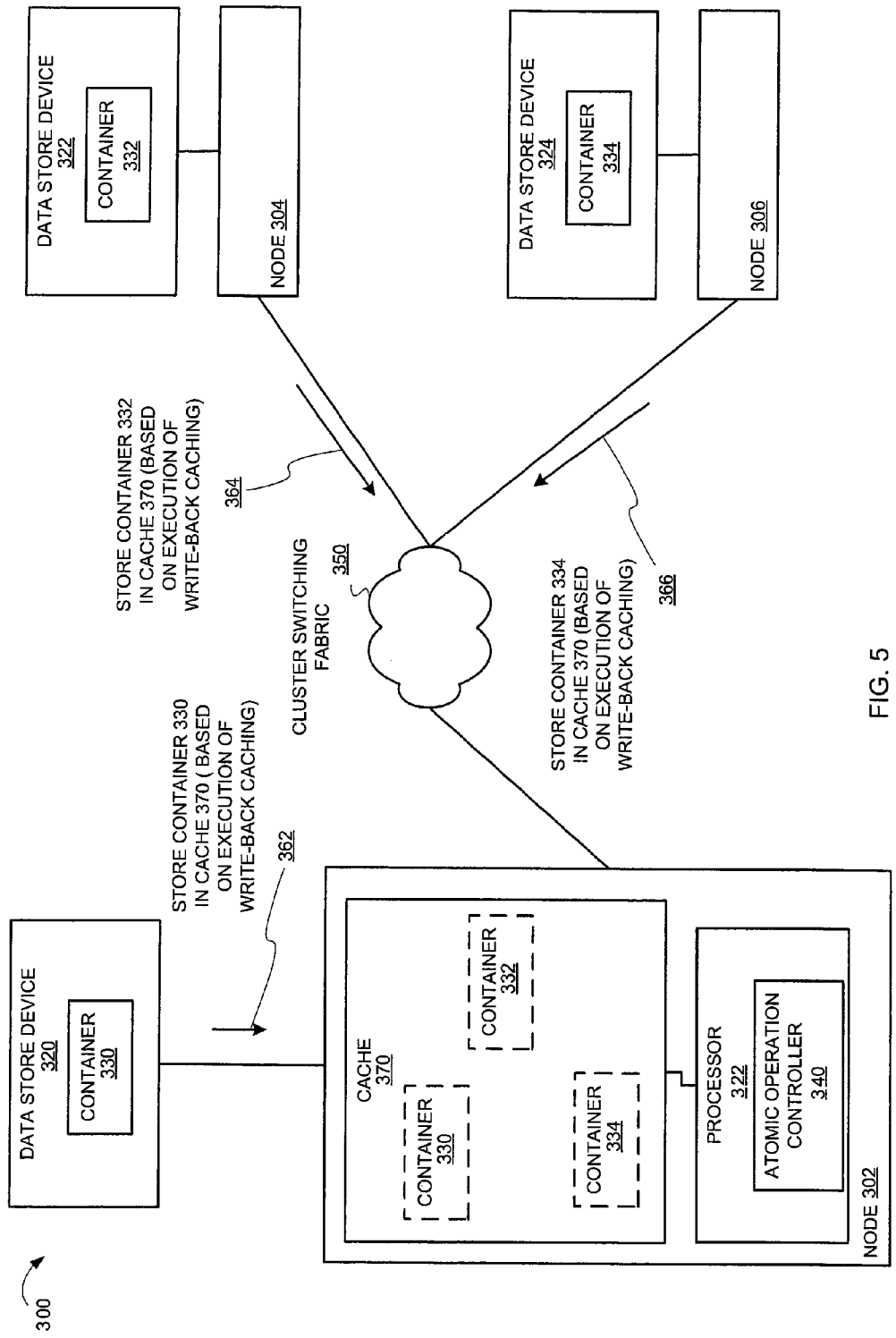
Figure 6:
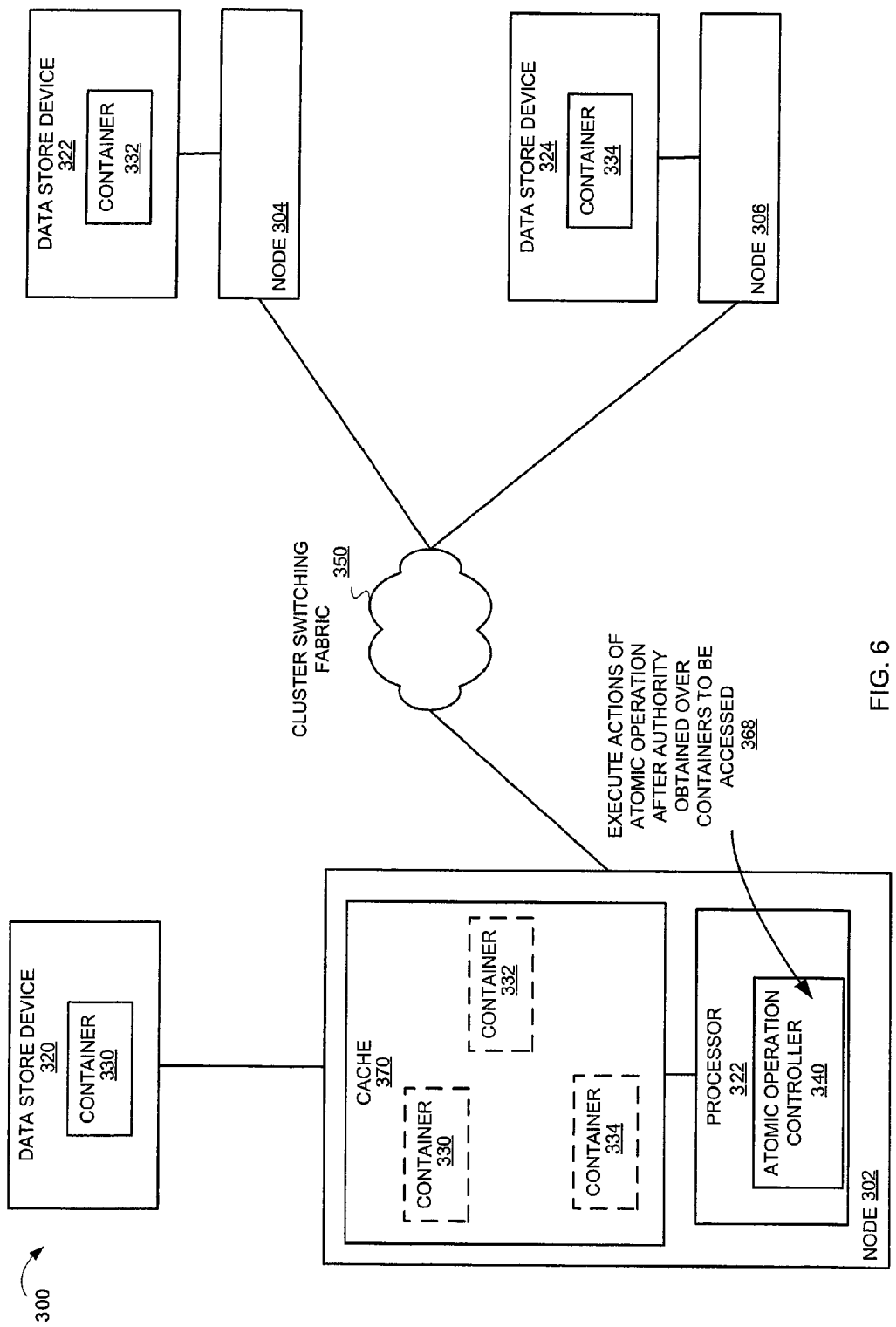

FIGS. 3-6 depict operations and messaging in a distributed storage system for execution of an atomic operation using write-back caching, according to some features. FIGS. 3-6 depict a system 300 having operations and messaging for execution of an atomic operation. In the example provided in FIGS. 3-6, the atomic operation is illustrated at four different points in time. FIG. 3 depicts a first point in time. FIG. 4 depicts a second point in time. FIG. 5 depicts a third point in time. FIG. 6 depicts a fourth point in time.

In this example, the system 300 includes a node 302, a node 304, and a node 306, which can be representative of the nodes 102 of FIG. 1. The node 302, the node 304, and the node 306 are interconnected as a cluster through a cluster switching fabric 350. The node 302 is coupled to a data store device 320. The node 304 is coupled to a data store device 322. The node 306 is coupled to a data store device 324.

In this example, the initiation and control of execution of an atomic operation is performed at the node 302, which is among the group of nodes in the system 300 used for storage of data. In other examples, the initiation and control of execution of an atomic operation is performed by a node or other computer that is not among the nodes in the system 300 used for storage of data. For example, a separate management node can provide this functionality.

The node 302 includes a processor 312 coupled to a cache 370. The processor 312 can execute the instructions for an atomic operation controller 340 to initiate and control execution of an atomic operation. Although not shown, each of the nodes 304-306 can also include a processor and cache. Also not shown, each of the nodes 302-306 can have an architecture similar to the architecture of the node 200 (shown in FIG. 2). The data store device 320 stores a container 330. The data store device 322 stores a container 332. The data store device 324 stores a container 334. In this example, the node 302 is considered the origin node for the container 330 and can grant authority to access the container 330 by caches in other nodes in the system 300. Similarly, the node 304 is considered the origin node for the container 332 and can grant authority to access the container 332 by caches in other nodes in the system 300. Similarly, the node 306 is considered the origin node for the container 334 and can grant authority to access the container 334 by caches in other nodes in the system 300.

In this example, the container 330, the container 332, and the container 334 (which are stored in different data store devices) are accessed as part of a same atomic operation. FIG. 3 depicts an initiation of an atomic operation (352) by the atomic operation controller 340. For example, an atomic operation can be initiated by a client (see, for example, clients 180 of FIG. 1) that requests that the node 302 perform an atomic operation that accesses containers distributively stored across different data store devices in the system 300. The atomic operation controller 340 can determine if the operation being requested is an atomic operation and if the containers that are affected by execution of operation are stored in at least two different data store devices in the system 300.

If the operation is atomic and if the containers accessed by execution of the operation are stored in at least two different data store devices, the atomic operation controller 340 can execute a write-back caching operation for each of the containers to be accessed (354). For example, a write-back caching operation can comprise a two-step process for each container to be accessed: 1) retrieve and 2) store. In particular, the atomic operation controller 340 can issue a retrieve request to each of the origin nodes that own the containers to be accessed. In response to the retrieve request and assuming that the container is available, the atomic operation controller 340 obtains authority over each of the containers. Once the atomic operation controller 340 obtains authority over a container, other processes or controllers are precluded from accessing (e.g., reading or writing) the container until the authority is relinquished by the atomic operation controller 340. Also as part of the write-back caching for the affected container and after authority is obtained for the container, the atomic operation controller 340 stores a copy of each of the containers in its cache (the cache 370).

To illustrate, FIG. 4 depicts the system 300 at a second point in time in which the atomic operation controller 340 issues retrieve requests for the affected containers (as part of the write-back caching operation). The atomic operation controller 340 can issue a retrieve request (356) for the container 330 at its own node 302. The atomic operation controller 340 can issue a retrieve request (358) for the container 332 to the node 304. The atomic operation controller 340 can issue a retrieve request (360) for the container 334 to the node 306. The atomic operation controller 340 can issue these retrieve requests one at a time, wherein a next retrieve request is only issued after authority is granted in response to a prior retrieve request. For example, the atomic operation controller 340 issues the retrieve request (358) for the container 332 after authority is granted to access the container 330. In other examples, the atomic operation controller 304 can issue the retrieve requests at least partially in parallel to the different origin nodes having authority over the different affected containers.

FIG. 5 depicts the system 300 at a third point in time in which copies of the affected containers are stored in the cache in response to the retrieve requests. In this example, the node 302 stores (362) a copy of the container 330 in the cache 370. The node 304 transmits (364) a copy of the container 332 for storage in the cache 370. The node 306 transmits (366) a copy of the container 334 for storage in the cache 370.

FIG. 6 depicts the system 300 at a fourth point in time in which actions of the atomic operation are executed after the write-back caching operation has retrieved and stored copies of the affected containers in the cache 370. As shown, after receiving authority over the affected containers based on retrieve requests, copies of each of the affected containers (the container 330, the container 332, and the container 334) are stored in the cache 370 as part of the write-back caching operation. The atomic operation controller 340 can then execute actions of the atomic operation (368). For example, these actions can include updating one or more of the containers 330-334. For any changes to the containers 330-334, the atomic operation controller 340 updates the copies stored in the cache 370.

After the actions of the atomic operation are complete, no additional operations are needed. Of particular note and different from conventional approaches, the atomic operation controller 340 does not perform any additional cleanup operations. For example, the atomic operation controller 340 is not required to release the containers 330-334 to complete the atomic operation. Subsequently, if an origin node needs to obtain authority over one of its affected containers, the origin node can request that the atomic operation controller 340 relinquish authority. In response to the request and after the atomic operation is complete, the atomic operation controller 340 can relinquish authority of the container. As part of relinquishing authority, the atomic operation controller 340 determines whether the container has been changed within the cache 370. If there is a change, the atomic operation controller 340 transmits the updated container to the origin node to update the origin container stored on the data store device. For example, assume that the atomic operation is complete and that the node 304 is requesting that the atomic operation controller 340 relinquish authority over the container 332. Also, assume that the copy of the container 332 in the cache 370 was updated during the atomic operation. In response to the request to relinquish authority, the atomic operation controller 340 can transmit the updated container 332 to the node 304. The node 304 can then update the container 332 stored in the data store device 322.

Figure 7:
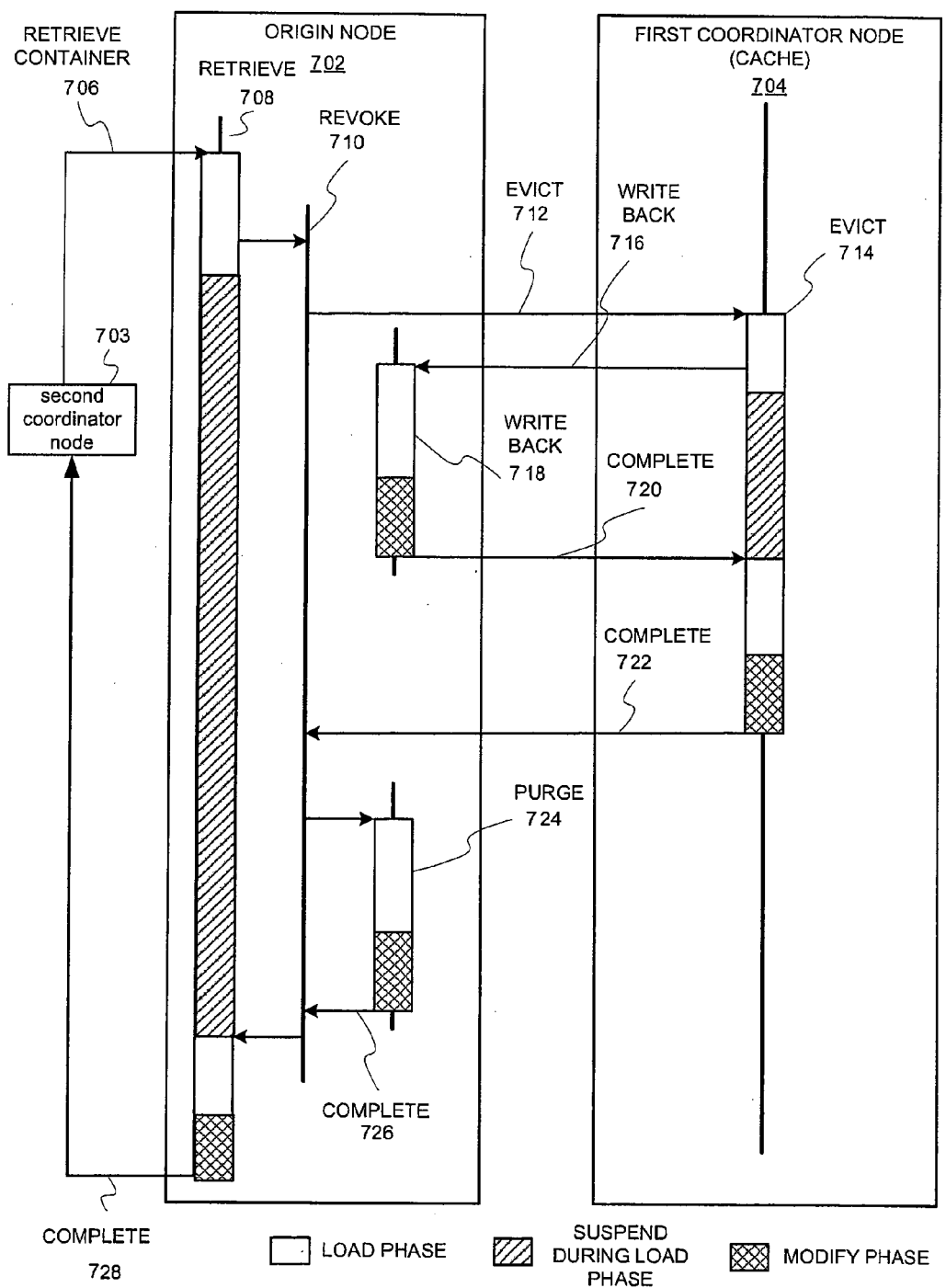
FIG. 7 depicts example communications between an origin node and a first coordinator node having current authority over a container, and a second coordinator node requesting authority over the container, according to some features.

FIG. 7 depicts example communications between an origin node, a first coordinator node having current authority over a container, and a second coordinator node requesting authority over the container, according to some features. FIG. 7 depicts an origin node 702, a first coordinator node 704, and a second coordinator node 703. With reference to FIGS. 3-6, the origin node can be either the node 304 or the node 306 where a container is stored in persistent storage. The first coordinator node can be the node 302. The second coordinator node can be another node (not shown in FIGS. 3-6) similar to the node 302 that can requests authority over a container as part of write-back caching to execute an atomic operation affecting the container.

In this example, the second coordinator node 703 is requesting authority over a container from the origin node 702. However, at the time of this request, the origin node 702 determines that the first coordinator node 704 currently has authority of the container whose authority is being requested by the second coordinator node 703. As further described below, the authority of the first coordinator node 704 is revoked by the origin node 702. This revocation of the authority causes the first coordinator node 704 to write back its changes (stored in its cache) back to the origin node 702.

FIG. 7 also depicts a number of tasks performed in the origin node 702 and the first coordinator node 704. These tasks can include different phases: 1) a load phase, 2) a suspend (during load) phase, and 3) a modify phase. The origin node 702 includes a retrieve task 708, a revoke task 710, a write-back task 718, and a purge task 724. The first coordinator node 704 includes an evict task 714.

The operations are initiated by a retrieve container request 706 being transmitted by the second coordinator node 703 and received by the origin node 702. In response, the origin node 702 can instantiate the retrieve task 708. The retrieve task 708 includes three phases: a load phase, a suspend (during load) phase, and a modify phase. In response to the retrieve container request 706, the load phase is initiated. The retrieve task 708 is to return the requested container back to the second coordinator node 703. However, in this example, this request conflicts with the first coordinator node 704 having a read-write copy of the container in its cache. Therefore, the retrieve container request 706 cannot be serviced by the origin node 702 until the authority over the container is revoked by the origin node 702. Thus, the origin node 702 constructs the revoke task 710 and enters a suspend phase until the revoke task 710 is complete. After the revoke task 710 has completed execution, the retrieve task 708 can be reawakened to complete its execution. At this point, there are no cache conflicts caused by the first coordinator node 704 and the retrieve task 708 can continue. The retrieve task 708 can record that the second coordinator node 703 has been granted a cache of the container so that future retrievals of the container by other coordinator nodes that would conflict with this cache can be similarly detected.

The revoke task 710 can find and revoke authority of existing caches for the container by coordinator nodes. The revoke task 710 can transmit an evict message to each of these coordinator nodes having a cached copy of the container. The revoke task 710 can then suspend until there is a response to each of the evict messages. After receiving each response and if the evict messages are successful, the revoke task 710 can proceed to its second stage. In this example, there is one coordinator node (the first coordinator node 704) having a cache of the container. The revoke task 710 transmits an evict message 712 to the first coordinator node 704.

In response to the evict message 712, the first coordinator node 704 initiates the evict task 714. If authority over the cache can be released, the evict task 714 transmits a write-back message 716 back to the origin node 702. The write-back message 716 includes any modifications made to the container that is contained in the cache of the first coordinator node 704. In response to the write-back message 716, the origin node 702 initiates the write-back task 718. The write-back task 718 updates the persistent copy of the container stored in the origin node 702 based on the modifications included in the write-back message 716. The updates to the container may require multiple write-back messages 716 because the number of updates can be greater than one write-back message can convey. Messages executing at the first coordinator node 704 can be precluded from changing the cache. Instead, any task attempting to load the cached container for read or write purposes is suspended behind the eviction of the container. This suspension can ensure that there is no race between the write-back and updates to the container stored in the cache of the first coordinator node 704. Additionally, the write-back task 718 can be fully idempotent. As an example, assume that ⅘ths of the updates may have been written to the origin node 702 when the origin node 702 suffers a lengthy suspended file operation (SFO) before the write-back could complete. In this example, the first coordinator node 704 can retry the write-back by issuing multiple messages 716. Alternatively, the first coordinator node 704 can stop the write-back and subsequently restart the write-back from the beginning After updating the persistent copy of the container in the origin node 702, the write-back task 718 transmits back a complete message 720 to the first coordinator node 704 to indicate that the write-back was successful. The evict task 714 can then expunge the cache in the first coordinator node 704. The evict task 714 can then transmit a complete message 722 back to the revoke task 710 executing on the origin node 702.

The revoke task 710 can then initiate the purge task 724. The purge task 724 can then clear the persistent cache state of the container. To guard against race conditions, the revoke task 710 will not service any new inbound cache retrievals for the container. This ensures the evict-purge cycle does not race with new, unevicted retrievals of the container. After the purge, the purge task 724 transmits a complete message 726 to the retrieve task 708. The retrieve task 708 can then resume from being suspended. The retrieve task then transmits a complete message 728 back to the second coordinator mode 703. The second coordinator mode 703 can then obtain authority over the container.

Figure 8:
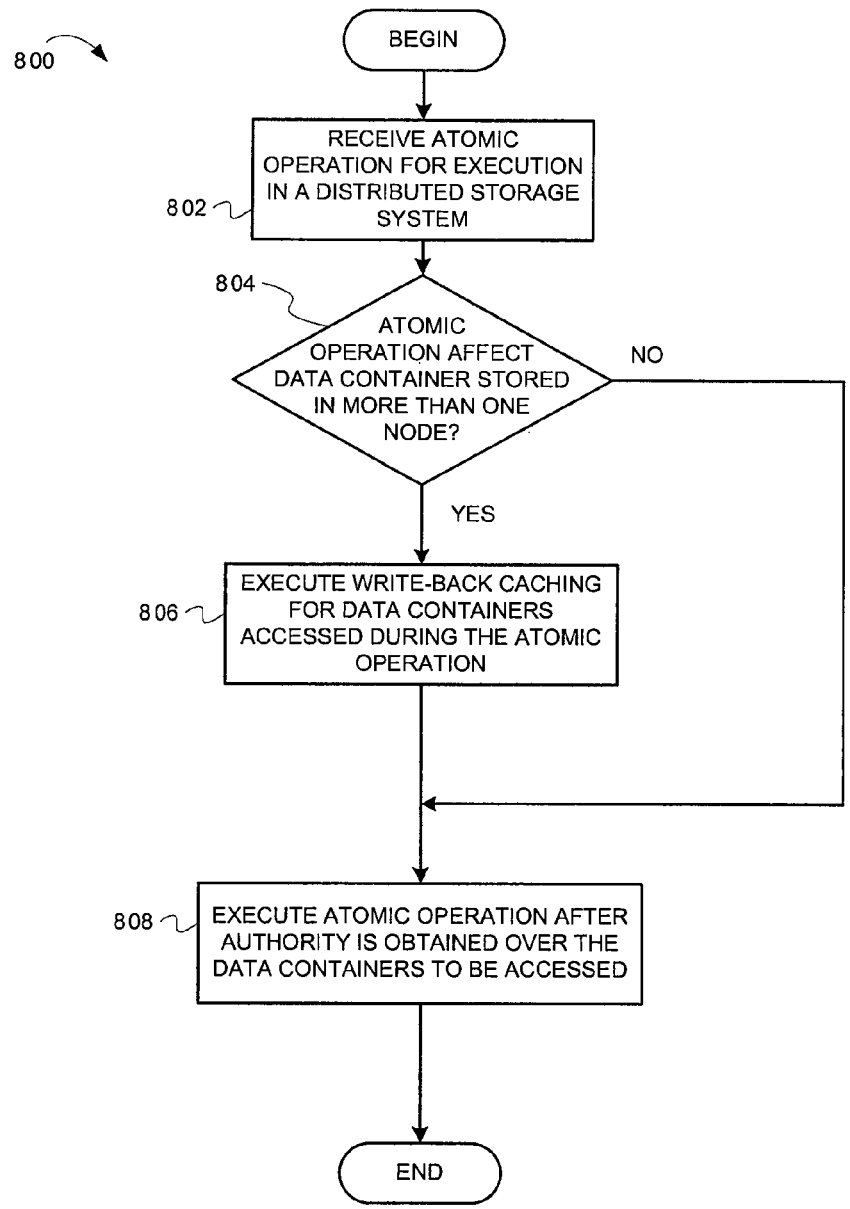
FIG. 8 depicts a flowchart for executing an atomic operation using write-back caching in a distributed storage system, according to some features.

FIG. 8 depicts a flowchart for executing an atomic operation using write-back caching in a distributed storage system, according to some features. The flowchart 800 of FIG. 8 is described in reference to the diagrams depicted in FIGS. 3-6. The operations of the flowchart 800 can be performed by software, firmware, hardware or a combination thereof. For the flowchart 800, the operations are described as being performed by the atomic operation controller 340 depicted in FIGS. 3-6. The operations of the flowchart 800 start at block 802.

At block 802, the atomic operation controller 340 receives an atomic operation for execution in a distributed storage system. The atomic operation controller 340 can be executing in a node that is associated with a data store device that is storing containers in the distributed storage system (similar to the node 302 in FIGS. 3-6). Alternatively, the atomic operation controller 340 can be part of a management node that is configured to execute atomic operations which, when executed, access containers that are stored in at least two data store devices at two different nodes in the distributed storage system. Therefore, the atomic operation controller 340 may not be required to execute an atomic operation if all of the data containers affected are stored in a single node. Rather, a different controller or modules can execute the atomic operation without using the atomic operation controller 340. For example, assume the atomic operation controller 340 is part of a management node and assume that a node A that is part of the distributed storage system receives an atomic operation from a client for execution. If node A determines that execution of the atomic operation affects containers at one node in the distributed storage system, node A can then execute the atomic operation on its own. Alternatively if node A determines that execution of the atomic operation affects containers stored at multiple nodes in the distributed storage system, node A can transmit the atomic operation to the management node for execution by the atomic operation controller. Operations of the flowchart 800 continue at block 804.

At block 804, the atomic operation controller 340 determines whether execution of the atomic operation is to affect data containers stored in more than one node in the distributed storage system. If execution of the atomic operation is to affect data containers stored in more than one node, a write-back caching operation is executed for the data containers affected by the atomic operation. Otherwise, the atomic operation can be executed without executing a write-back caching operation for the data containers affected. Therefore, if execution of the atomic operation is to affect data containers stored in more than one node, operations of the flowchart 800 continue at block 806. Otherwise, operations of the flowchart 800 continue at block 808 (which is further described below).

At block 806, the atomic operation controller 340 executes a write-back caching operation for each of the data containers that are to be accessed during execution of the atomic operation. As described above, the write-back caching operation for a data container can obtain authority (read/write access) over the data container from the origin node. After obtaining authority, the write-back caching operation can store a copy of the data container in the cache for both read and write access. With reference to FIG. 5, copies of the containers 330-334 are stored in the cache 370 of the node 302 from the different origin nodes for the containers 330-334. Operations of the flowchart 800 continue at block 808.

At block 808, the atomic operation controller 340 executes the atomic operation after authority has been obtained over the data containers to be accessed. As described above, if the data containers to be accessed are stored in more than one node, authority can be obtained using a write-back caching operation for each of the data containers to be accessed. With reference to FIG. 6, the atomic operation controller 340 executes different actions (e.g., read and write) of the atomic operation after the copies of the containers 330-334 are stored in the cache 370. For example, the atomic operation can modify the containers 330 and 334 while reading the container 332. If the data containers to be accessed are stored in the same node, a write-back caching operation may not be required. For example, instead of using write-back caching operations, a lock of the data containers can be requested from the origin node to obtain authority over the data containers. Alternatively, even if the data containers to be accessed are stored in a same node, a write-back caching operation may still be used to obtain authority over the data containers.

As described above, if the write-back caching operations are used to obtain authority over the data containers, the atomic operation controller 340 does not need to perform any additional cleanup operations. For example, the atomic operation controller 340 is not required to release the containers 330-334 to complete the atomic operation. Subsequently, if an origin node needs to obtain authority over one of its affected containers, the origin node can request that the atomic operation controller 340 relinquish authority. In response to the request and after the atomic operation is complete, the atomic operation controller 340 can relinquish authority of the container. As part of relinquishing authority, the atomic operation controller 340 determines whether the container has been changed within the cache 370. If there is a change, the atomic operation controller 340 transmits the updated container to the origin node to update the origin container stored on the data store device. For example, assume that the atomic operation is complete and that the node 304 is requesting that the atomic operation controller 340 relinquish authority over the container 332. Also, assume that the copy of the container 332 in the cache 370 was updated during the atomic operation. In response to the request to relinquish authority, the atomic operation controller 340 can transmit the updated container 332 to the node 304. The node 304 can then update the container 332 stored in the data store device 322. If a write-back caching operation is not used to obtain authority over data containers stored in same node, the authority can be released back to the origin node prior to completion. Operations of the flowchart 800 are complete.

As will be appreciated by one skilled in the art, aspects may be embodied as a system, method or computer program product. Accordingly, aspects may take the form of entirely hardware, entirely software (including firmware, resident software, micro-code, etc.) or a combination of software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described with reference to flowchart illustrations and/or block diagrams of methods, apparatus (systems) and computer program products according to different features. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the features are described with reference to various configurations and exploitations, it will be understood that these descriptions are illustrative and that the scope of the features is not limited to them. In general, techniques for atomic operations using write-back caching in a distributed storage system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the features described herein. In general, structures and functionality presented as separate components in the example configurations may be implemented as a combined structure or component. Similarly, structures and functionality presented as a single component may be implemented as separate components. These and other variations, modifications, additions, and improvements may fall within the features described herein.

What is claimed is:

1. A method comprising:
   receiving an atomic operation for execution, wherein the execution of the atomic operation is to access a data container stored in multiple storage devices each associated with a node of a distributed storage system;
   executing, in response to receiving the atomic operation, a write-back cache operation for the data container to preclude access of the data container by a different operation prior to completion of the atomic operation, the write-back cache operation including:
      obtaining authority over each data container stored in the multiple storage devices from the associated node, said authority precluding access to the data container by other processors or controllers, and
      storing a copy of each data container over which authority is obtained in a cache of a first node of the distributed storage system; and
   executing the atomic operation using one or more of the cached copies of the data containers.

2. The method of claim 1,
   wherein the method comprises modifying a cached copy of a data container, in response to executing the atomic operation.

3. The method of claim 2, wherein after execution of the atomic operation and in response to a request for authority of the data container from a second node, the data container stored in the data store device of the second node is updated based on a cached copy of the data container.

4. The method of claim 1, wherein the first node is a management node, and wherein executing the atomic operation comprises executing the atomic operation in the management node, wherein the management node is not associated with the multiple storage devices where the data container is stored.

5. The method of claim 1, wherein executing the atomic operation is without releasing authority over one or more of the data containers stored in the multiple storage devices.

6. A non-transitory machine readable medium having stored thereon instructions comprising machine executable code which when executed by at least one machine, causes the at least one machine to:
receive an atomic operation for execution, wherein the execution of the atomic operation is to access a data container stored in multiple storage devices each associated with a node of a distributed storage system;
execute, in response to receipt of the atomic operation, a write-back cache operation for the data container to preclude access of the data container by a different operation prior to completion of the atomic operation, the write-back cache operation including:
obtaining authority over each data container stored in the multiple storage devices from the associated node, said authority precluding access to the data container by other processors or controllers, and
storing a copy of the data container over which authority is obtained in a cache of a first node of the distributed storage system; and
execute the atomic operation using one or more of the cached copies of the data containers.

7. The non-transitory machine readable medium of claim 6,
wherein the machine executable code comprises machine readable executable code which when executed by the at least one machine causes the at least one machine to modify a cached copy of a data container, in response to execution of the atomic operation.

8. The non-transitory machine readable medium of claim 7, wherein after execution of the atomic operation and in response to a request for authority of the data container from a second node, the data container stored in the data store device of the second node is updated based on a cached copy of the data container.

9. The non-transitory machine readable medium of claim 6,
wherein the first node is a management node, and
wherein the machine executable code which when executed by the at least one machine causes the at least one machine to execute the atomic operation comprises machine readable executable code which when executed by the at least one machine causes the at least one machine to execute the atomic operation in the management node, wherein the management node is not associated with the multiple storage devices where the data container is stored.

10. The non-transitory machine readable medium of claim 6, wherein the machine executable code which when executed by the at least one machine causes the at least one machine to execute the atomic operation is independent of a release of authority over one or more of the data containers in the multiple storage devices.

11. An apparatus comprising:
a processor; and
a computer readable storage medium having program instructions embodied therewith, the program instructions executable by the processor to cause the apparatus to,
receive an atomic operation for execution, wherein the execution of the atomic operation is to access a data container stored in a plurality of data store devices of multiple nodes of a distributed storage system, each data store device associated with a node;
determine whether execution of the atomic operation would access the data container stored in more than one data store device of the plurality of data store devices;
execute, after determination that the atomic operation would access the data container stored in the more than one data store device, a write-back cache operation for the data container, wherein the write-back cache operation comprises program instructions to,
request authority to access the data container stored in the more than one data store device from each associated node; and
store, after receipt of the authority, copies of the data container in a cache; and
execute, after execution of the write-back cache operation, the atomic operation, wherein the program instructions to execute the atomic operation comprise program instructions to access the data container stored in the more than one data store device of the distributed storage system.

12. The apparatus of claim 11, wherein the apparatus is not configured to control access to the more than one data store device where the data container is stored.

13. The apparatus of claim 11, wherein the apparatus is configured to control access to one of the more than one data store device where the data container is stored.

14. The apparatus of claim 11, wherein the program instructions to execute the atomic operation is independent of releasing authority over the data container.

15. The apparatus of claim 11, wherein a node of the multiple nodes having a data store device is configured to store the data container, wherein a copy of the data container in the cache is modified in response to execution of the atomic operation.

16. The apparatus of claim 15, wherein the data container stored in the data store device is to be updated based on the copy of the data container in the cache, after execution of the atomic operation and in response to a request for authority of the data container back from the apparatus.

* * * * *